United States Patent
Molnar et al.

(10) Patent No.: US 9,426,696 B2
(45) Date of Patent: Aug. 23, 2016

(54) METHODS, APPARATUSES, SYSTEM, RELATED COMPUTER PROGRAM PRODUCT FOR HANDOVER PROCEDURES

(75) Inventors: Jozsef Molnar, Budapest (HU); Virpi Satu Helena Vikman, Hyvinkää (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 13/883,017

(22) PCT Filed: Aug. 22, 2011

(86) PCT No.: PCT/EP2011/064384
§ 371 (c)(1),
(2), (4) Date: Jul. 24, 2013

(87) PCT Pub. No.: WO2012/025490
PCT Pub. Date: Mar. 1, 2012

(65) Prior Publication Data
US 2013/0295933 A1    Nov. 7, 2013

(30) Foreign Application Priority Data

Aug. 24, 2010   (WO) ................ PCT/EP2010/062324

(51) Int. Cl.
*H04W 36/00* (2009.01)
*H04W 8/18* (2009.01)
*H04W 48/04* (2009.01)

(52) U.S. Cl.
CPC ..... *H04W 36/0005* (2013.01); *H04W 36/0055* (2013.01); *H04W 8/18* (2013.01); *H04W 48/04* (2013.01)

(58) Field of Classification Search
CPC . H04W 88/08; H04W 36/18; H04W 72/005; H04W 36/14; H04W 36/38; H04W 84/045; H04W 28/18; H04W 36/0005; H04W 36/0066; H04W 36/12; H04W 36/00; H04W 36/06; H04W 48/18; H04W 52/0212; H04W 36/0055; H04W 48/02; H04W 76/028; H04W 84/047; H04W 88/16; H04W 8/245; H04W 16/14; H04W 36/0022; H04W 36/0061; H04W 36/0077; H04W 36/385; H04W 48/16; H04W 48/20; H04W 60/00; H04M 3/42229; H04M 2203/2094; H04M 7/00; H04L 12/189; H04Q 2213/13532
USPC .......... 455/436, 437–439, 440, 432.1, 432.3, 455/433; 370/328, 331–334
See application file for complete search history.

(56) References Cited

U.S. PATENT DOCUMENTS 6,687,237 B1 * 2/2004 Lee et al. .................... 370/331
7,062,270 B1   6/2006 Dalvie et al.
(Continued)

FOREIGN PATENT DOCUMENTS

| EP | 1993309 A1 | 11/2008 | |
|---|---|---|---|
| EP | 1993309 A1 * | 11/2008 | ............... H04Q 7/38 |
| EP | 2190243 A1 | 5/2010 | |

OTHER PUBLICATIONS

GSM Standard No. 03.09 version 5.1.0; published Aug. 1997 pp. 17-20.*

(Continued)

*Primary Examiner* — Nizar Sivji
(74) *Attorney, Agent, or Firm* — Squire Patton Boggs (US) LLP

(57) ABSTRACT

It is disclosed methods, apparatuses, system and related computer program for handover procedures. The method comprises a network node verifying if a location area of a handover destination belongs to a zone wherein a subscriber is allowed to access services and based on such verification either successfully handing over a call or rejecting a handover request.

10 Claims, 10 Drawing Sheets

(56) References Cited

U.S. PATENT DOCUMENTS

| | | | | |
|---|---|---|---|---|
| 7,289,808 | B1* | 10/2007 | Uskela | 455/436 |
| 7,706,797 | B2* | 4/2010 | Henttonen | H04W 36/0033 370/328 |
| 2001/0005676 | A1* | 6/2001 | Masuda et al. | 455/433 |
| 2006/0291416 | A1* | 12/2006 | Rexhepi et al. | 370/331 |
| 2007/0230440 | A1 | 10/2007 | Joong et al. | |
| 2009/0190550 | A1* | 7/2009 | Giustina et al. | 370/331 |
| 2010/0002629 | A1 | 1/2010 | Moussa | |
| 2011/0077008 | A1* | 3/2011 | Lu et al. | 455/436 |

OTHER PUBLICATIONS

"Digital Cellular telecommunications system (Phase 2+); Handover procedures (GSM 03.09 version 5.1.0)", 3GPP Standard; GSM 03.09, 3rd Generation Partnership Project; Version 5.1.0, Aug. 1, 1997, pp. 1-85, XP050381483.

International Search Report and Written Opinion dated Nov. 15, 2011 corresponding to International Patent Application No. PCT/EP2011/064384.

* cited by examiner

METHODS, APPARATUSES, SYSTEM, RELATED COMPUTER PROGRAM PRODUCT FOR HANDOVER PROCEDURES

FIELD OF THE INVENTION

The present invention relates handovers procedures in communication networks. More specifically, the present invention relates to methods, apparatuses, a system, a related computer program product for handover procedures in communication networks.

BACKGROUND $3^{rd}$ Generation Partnership Project (3GPP) specifies various handover procedures in mobile communication networks. The purpose of handover procedures is to ensure that the connection to the Mobile Station (MS) or User Equipment (UE) is maintained as it moves from one cell or radio network to another. Handover between base station systems (BSS) or radio network subsystems (RNS) connected to the same mobile services switching centre (MSC) or 3G_MSC is termed as intra-MSC handover or intra-3G_MSC handover/relocation. Handover between base station systems (BSS) or radio network subsystems connected to different MSCs or 3G_MSCs is termed as inter-MSC handover or inter-3G_MSC handover/relocation. In addition, handover can happen between two access technologies. Such handovers are referred to as inter-system handover. An example of a known intersystem handover is a handover between Global System for Mobile communications (GSM) and Universal Mobile Telecommunications System (UMTS).

A communication network operator may wish to control the usage of network and availability of services on a per subscriber basis. One exemplary way of achieving such a control can be by defining zones in the network. A zone may comprise one or more location areas, which in turn may comprise one or more cells in a GSM network or service areas in a UMTS network. For each subscriber, an operator can specify a list of zones where the subscriber is allowed to access services (hereinafter referred to as allowed zones). This can be done by a listing of zone identities in a subscriber database such as a home location register (HLR) in GSM networks. Further, the operator may store a zone configuration in a network node such as MSC, such zone configuration may be a mapping between zone identities and location areas.

It may be noted that operator may choose to specify a list of zones where a subscriber is not allowed to access services (hereinafter referred to as restricted zones), instead of specifying allowed zones. In a further option, an operator may choose to specify both list of allowed zones and list of restricted zones. The procedures described herein can as well be applied to these alternative implementations.

During location update procedure, the list of zone identities indicating allowed zones, restricted zones or both allowed and restricted zones, is downloaded from HLR by the visited location register (VLR) and is made available to the MSC. Thus, when a request for service is received from a particular location area in the network, the MSC can determine the identity of the zone to which the location area belongs and verify if access to services is allowed for the subscriber in the zone.

It is possible for an operator to define such service access restrictions for all the subscribers either temporarily or permanently to certain zones. This can be, for example, for security reasons. Access to services in certain location area in a network may be controlled a mobile services switching centre (MSC) based on a zone identity list in a subscription data and the zone configuration in the MSC.

With the list of zones defined per subscriber in the form of zone identities in HLR and the zone configurations defined in MSC, operator can control the access to services by subscribers. For example, a subscriber is allowed to get services (for example, location update, voice services, messaging etc) only when the subscriber initiates a communication session from a location area that belongs to an allowed zone. When the subscriber initiates a session from a location area that does not belong to an allowed zone (that is restricted zone), the session request will be rejected. This is possible since the MSC, which controls the session, is aware of the location of the subscriber and also the list of allowed zones.

Examples of such procedures are shown below.

In HLR, for a subscriber, allowed zone identities: 1, 2 and 5.

Zone configuration in MSC1:
Location areas under MSC1: 1000, 1001, 1002, 1003, 1004
Zone identities—location areas mapping:
Zone 1: 1000, 1001;
Zone 2: 1001, 1002, 1003;
Zone 3: 1004.
Zone configuration in MSC2:
Location areas under MSC2: 2000, 2001, 2002, 2003
Zone identities—location areas mapping:
Zone 1: 2000, 2001;
Zone 5: 2002.

EXAMPLE 1

Subscriber initiates location update to location area 1001 (in MSC1). Since the location area 1001 is part of allowed zones 1 and 2, location update is performed.

EXAMPLE 2

Subscriber initiates a call in location area 1004 (in MSC1). Since the location area 1004 does not belong to any of the allowed zones for the subscriber (i.e., 1, 2 and 5), the call is rejected.

EXAMPLE 3

Subscriber initiates a sending of a short message in location area 1000 (in MSC1). Since location area 1000 is within the allowed zone 1 for the subscriber, short message can be sent.

However, when a call has started in a location area where a subscriber is allowed to access service and a handover to a location area belonging to a zone where the subscriber is not allowed to access services is requested, the session will be allowed to continue, since it is not verified whether the subscriber is allowed to access services or not in the zone to which the subscriber is handed over. For example, in the above described example, if the subscriber initiates a call in the location area 1000 and then a handover to location area 1004 happens, the MSC1 does not verify if the location area 1004 belongs to an allowed zone or not and the call continues without rejection. Similarly, in case a handover happens to a location area under MSC2 in the above described example, MSC2 is not aware of the allowed zone identities, since only MSC1 where the location update happens is aware of the allowed zone identities.

Thus, after a successful handover, a subscriber can freely continue to access services in zones where the subscriber is not allowed to access services as defined by the operator, since it is not verified if the location area belongs to an allowed zone and further in case of inter-MSC handovers, the target MSC to which the handover happens is not even aware of the allowed zone identities. This means zone identities for a subscriber and zone configurations defined by the operator have no impact on subscribers' access to services while being mobile in handover scenarios. Thus network operator cannot restrict service access in case of sessions in which handovers happen.

Although the problems described above refer to network elements in circuit switched domain, similar problems exist in packet switched domain, wherein a serving GPRS support node (SGSN) provides similar functions as MSC in circuit switched domain.

Thus, there is a need for procedures by which zone information defined by a network operator can be used in handover scenarios in circuit switched and packet switched domains of mobile networks.

SUMMARY

In consideration of the above, it is an object of examples of the present invention to overcome one or more of the above drawbacks. In particular, the present invention provides methods, apparatuses, a system, and a related computer program product for service access restrictions during handover scenarios in communication networks.

According to a first embodiment of the present invention, there is provided a method comprising: storing a mapping of zone identities and location areas; receiving a handover requisition message (251, 351, 451, 652, 853, 953) for a subscriber, the message comprising information relating to a location area of a handover destination; obtaining an information comprising at least one of a list of zone identities indicating zones wherein the subscriber is allowed to access services and a list of zone identities indicating zones wherein the subscriber is not allowed to access services; and verifying (252, 352, 452, 653, 854, 954) if the location area of the handover destination belongs to a zone wherein the subscriber is allowed to access services.

In the method of the first embodiment, the obtaining the information may comprise receiving the information in the handover requisition message. Alternatively, the obtaining the information may comprise obtaining the information during a location update.

The handover requisition message in the method of the first embodiment may comprise one of a A-HANDOVER-REQUIRED message (251, 451); a Iu-RELOCATION-REQUIRED message (351); and a MAP-Prep-handover-request message (652, 853, 953).

The method of the first embodiment may further comprise sending a first resultant message (253, 353, 453, 654, 855) to a network element (222, 322, 422, 622, 823) if the result of the verifying is positive. The first resultant message may comprise any of a A-Handover-Request message (253, 654; 855); and a Iu-Relocation-Request message (353, 453).

The method may further comprise sending a second resultant message (254, 354, 454, 655, 955) to a network element (221, 321, 421, 631, 931) if the result of the verifying is negative. The second resultant message may comprise any of a A-Handover-Required-Reject message (254, 454); a Iu-Relocation-preparation-failure message (354); and a MAP-Prep-Handover-Response comprising Handover-Failure message (655, 955).

In the method of the first embodiment, the network element may comprises one of a base station system (221, 222, 421, 622, 823); a radio network system (321, 322, 421, 422); a mobile services switching centre (631, 931); a 3G-mobile services switching centre; and a serving GPRS support node.

According to a second embodiment of the present invention, there is provided a first apparatus (1001) comprising: a receiver (1031) configured to receive a handover requisition message comprising information relating a location area of handover destination for a subscriber (251, 351, 451, 652, 853, 953); a storage configured to store a mapping of zone identities and location areas; a verifier (1041) configured to verify (252, 352, 452, 653, 854, 954) if the subscriber is allowed access services in the location area of handover destination; and a transmitter (1051) configured to send a resultant message (253, 254, 353, 354, 453, 454, 654, 655, 855, 955) based on the result of the verifying in the verifier.

The first apparatus according to the second embodiment may comprise one of a mobile services switching centre; a 3G-mobile services switching centre; and a serving GPRS support node.

The second embodiment further provides a second apparatus (1002) comprising: a receiver (1032) configured to receive a first handover requisition message (651, 852, 952); and a transmitter (1052) configured to send a second handover requisition message (652, 853, 953) comprising an indication of zones wherein the subscriber is allowed to access services.

The second apparatus according to the second embodiment comprises one of a mobile services switching centre; a 3G-mobile services switching centre; and a serving GPRS support node.

In a third embodiment of the invention, there is provided a system comprising: a first apparatus (1001) of the second embodiment; and a second apparatus (1002) of the second embodiment.

In a fourth embodiment of the present invention, there is provided a computer program product comprising code means for performing method steps according to the first embodiment of the present invention, when run on a processing means or module.

Embodiments of the present invention may have one or more of following advantages:

A network operator can have better control over availability of services in the network;

A network operator can advantageously introduce restrictions in service availability for all subscribers of the network in a particular area either temporarily or permanently;

A network operator can specifically introduce per subscriber based rules for regional roaming;

The procedures described herein can advantageously be used in any handover scenario (intra-MSC, inter-MSC, inter-system etc).

The procedures described herein can work in various types of network such as GSM, UMTS, Unlicensed mobile access (UMA) networks, Circuit-switched networks, packet switched networks etc.

BRIEF DESCRIPTION OF THE DRAWINGS

Examples of the present invention are described herein below with reference to the accompanying drawings, in which.

DETAILED DESCRIPTION OF THE PRESENT INVENTION

Examples of the present invention are described herein below by way of example with reference to the accompanying drawings.

Figure 1:
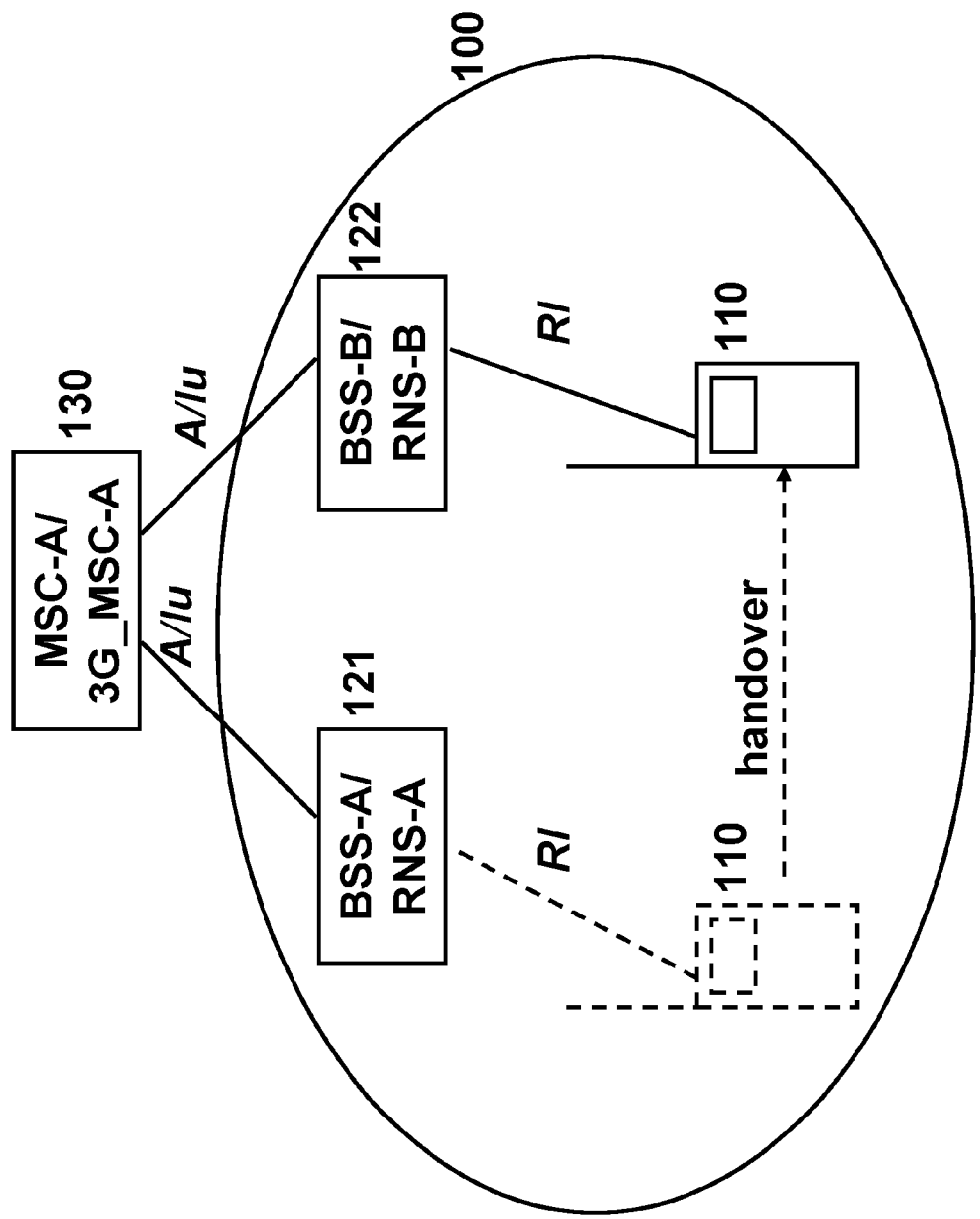
FIG. 1 shows a network architecture, according to an example of the present invention, wherein intra-MSC handover may be performed.

FIG. 1 illustrates an intra-MSC handover from one base station system (BSS-A) or radio network system (RNS-A) to another base station system (BSS-B) or radio network system (RNS-B). Relevant interfaces between the network elements are also shown in FIG. 1. Within the access network 100, the mobile station (MS) or user equipment (UE) 110 can connect to the base station system (BSS) 121 or 122 in a GSM network or a radio network system (RNS) 121 or 122 in an UMTS network through a radio interface (RI). The radio interface is defined as Um in GSM networks and Uu in UMTS networks. The BSSs 121 and 122 can connect to the same MSC (MSC-A) 130 in core network using the A-interface of the GSM standard. In case of UMTS networks, the RNSs 121 and 122 can connect to the 3G_MSC (3G_MSC-A) 130 using the Iu interface defined in 3gpp standards.

Figure 2:
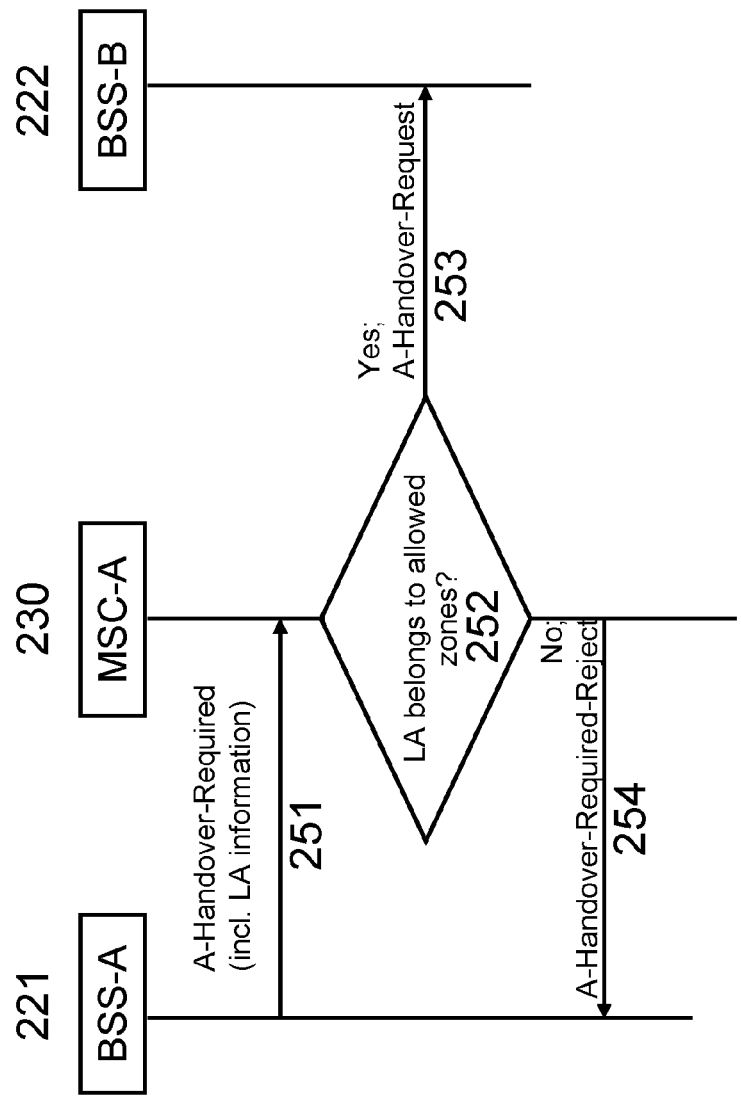
FIG. 2 shows an intra-MSC handover procedure in a GSM network according to an example of the present invention.

FIG. 2 illustrates an exemplary intra-MSC handover procedure in a GSM network in accordance with the present invention. A mobile station or user equipment of a subscriber can measure and periodically report to a base station system the signal quality of the current and neighboring cells (not shown in the figure). If the BSS-A determines that, for instance, the signal quality is not good enough and a neighboring cell is offering a better signal quality, the BSS can send a handover requirement message 251, e.g., A-Handover-Required, to MSC-A over the A-interface. It may be noted that poor signal quality is only one exemplary reason for a handover requirement and there can be several other reasons for such a handover requirement, such as, for example, poor uplink/downlink quality or strength, traffic in a cell and need to reduce load in a serving cell. The handover required message 251 contains the location area (LA) of the handover destination. Upon receipt of the handover required message, the MSC-A can verify (252) if the LA belongs to a zone where the subscriber is allowed to access services. It may be noted that during a call set up, the MSC-A can receive at least one of a list of allowed zones and restricted zones, for example as zone identities, for the subscriber from the visiting location register (VLR), which could have originally received it from the home location register (HLR) at the time of location update. Also, a mapping of zone identities and location areas can be stored in the MSC-A. If the MSC-A determines that the LA belongs to a zone where the subscriber is allowed to access services, it can send an A-Handover-Request message 253 to the target base station system (BSS-B). If the MSC-A determines that the LA does not belong to an allowed zone for the subscriber, it can send an A-Handover-Required-Reject message 254 to the source base station system (BSS-A).

Figure 3:
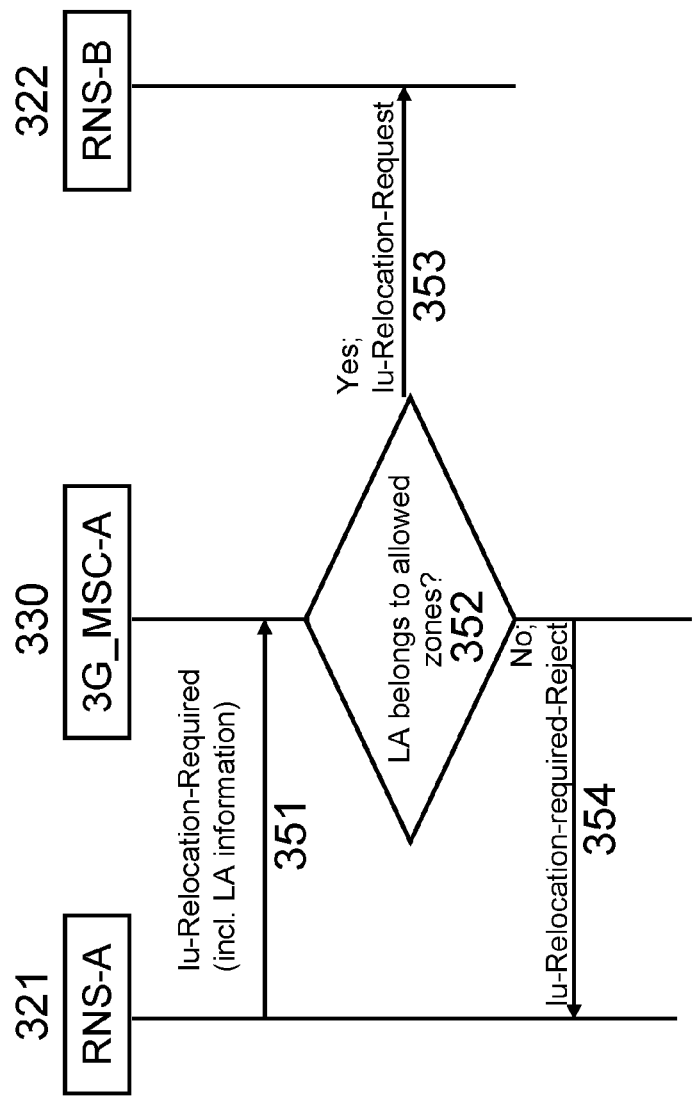
FIG. 3 shows an intra-3G_MSC handover procedure in a UMTS network according to an example of the present invention.

FIG. 3 illustrates an intra-MSC handover procedure in case of 3G UMTS networks. The procedure is similar to the handover procedure described in connection with GSM networks. The key differences are the interfaces and the message content. For example, the Handover-required message 251 and Handover-requested message 253 over A-interface in GSM networks (in FIG. 2) are respectively substituted by Relocation-Required message 351 and Relocation-Request message 353 over Iu interface.

Figure 4:
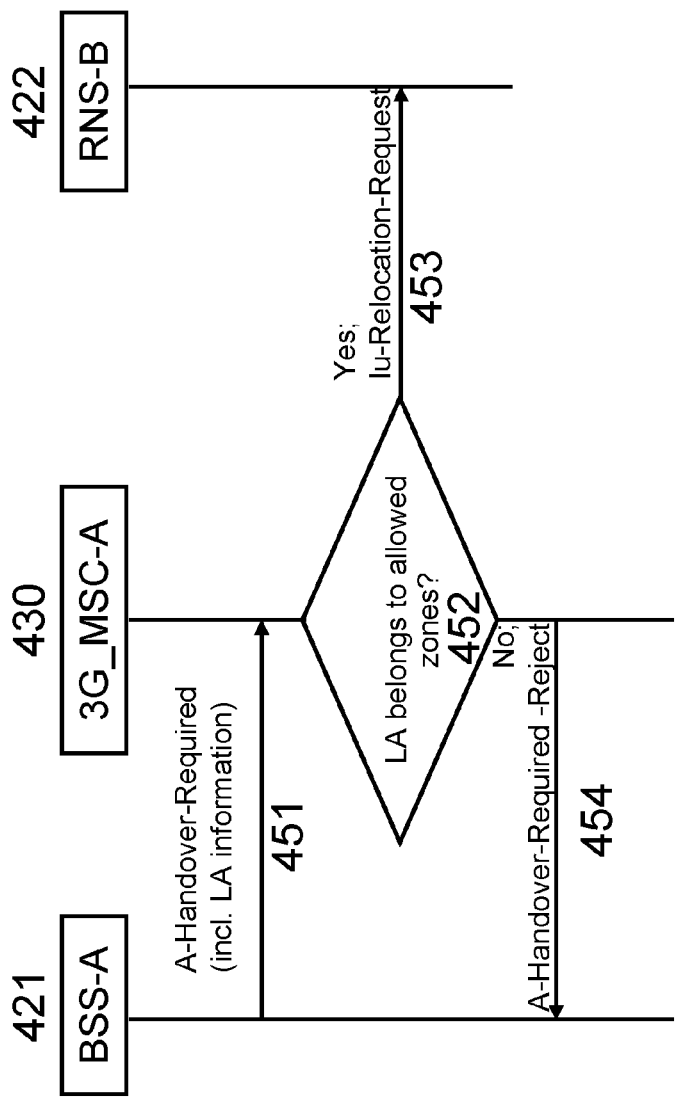
FIG. 4 shows an inter-system (GSM-UMTS) intra-MSC handover procedure according to an example of the present invention.

FIG. 4 shows an inter-system intra-MSC handover procedure. In this case, a 3G_MSC 430 is assumed to support an A-interface with a BSS (BSS-A 421). On receipt of a handover required message 451 that includes the location area information relating to RNS-B 422, the 3G_MSC-A 430 can verify (452) if the location area belongs to the allowed zones. It may be noted that during a call set up, the 3G_MSC-A 430 can receive at least one of a list of allowed zones and restricted zones, for example as zone identities, for the subscriber from the visiting location register (VLR), which could have originally received it from the home location register (HLR) at the time of location update. Also, a mapping of zone identities and location areas can be stored in the 3G_MSC-A. If the location area belongs to the allowed zones, the 3G_MSC-A 430 can send a Relocation Request over Iu interface 453 to RNS-B 422. If the location area does not belong to the allowed zones, 3G_MSC-A 430 can send a Handover-Required-Reject message 453 to BSS-A 421.

Figure 5:
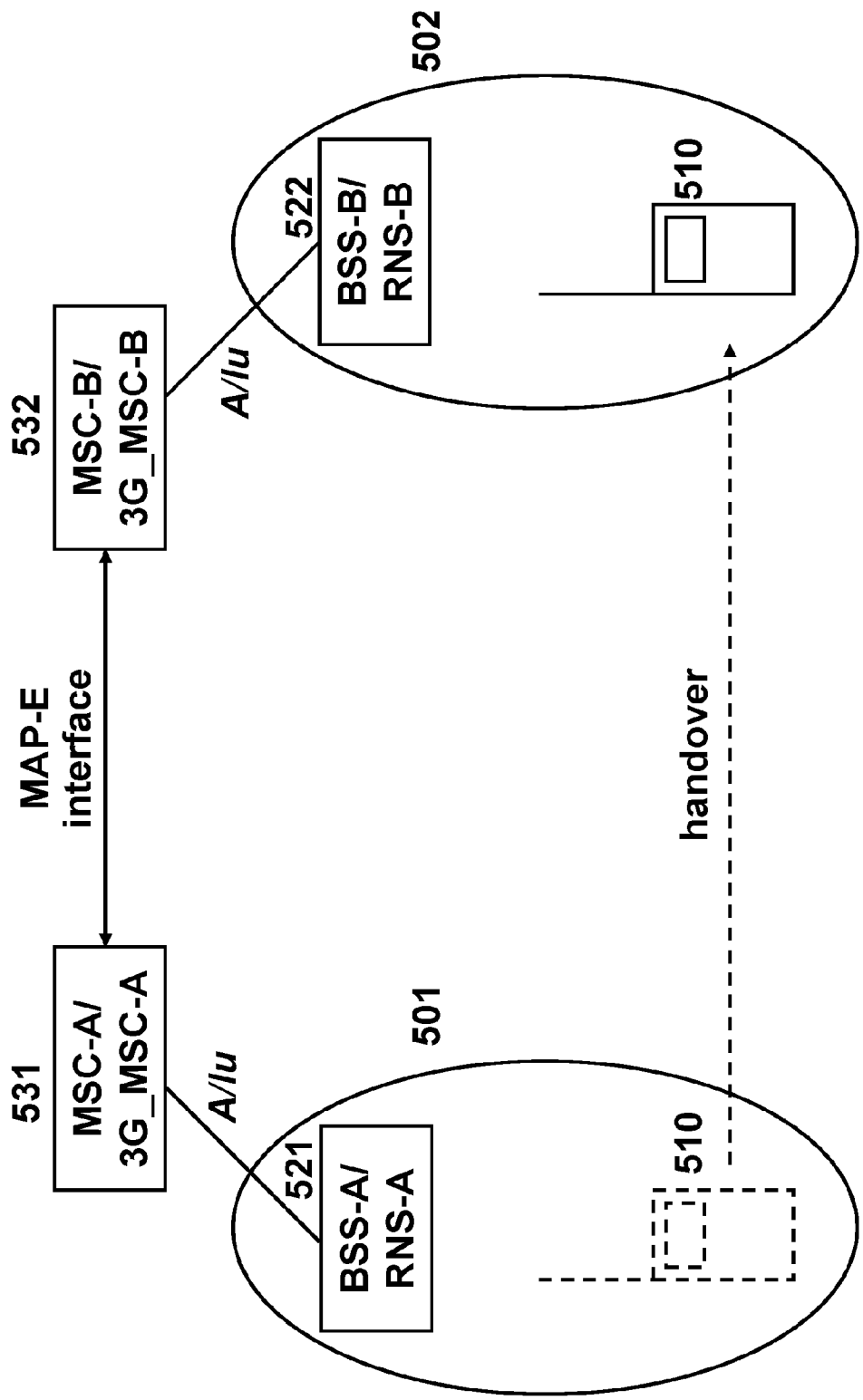
FIG. 5 shows a network architecture, according to the present invention, wherein inter-MSC handover as well as inter-system handover may be performed.

FIG. 5 illustrates an inter-MSC handover from one mobile services switching centre (MSC-A 531) or 3G-mobile services switching centre (3G_MSC-A 531) to another mobile services switching centre (MSC-B 532) or 3G-mobile services switching centre (3G_MSC-B 532). Relevant interfaces between the network elements are also shown in FIG. 4. Within the access area 501, the mobile station (MS) or user equipment (UE) 510 can connect to the base station system (BSS-A) 521 in a GSM network or a radio network system (RNS-A) 521 in an UMTS network through a radio interface (RI). The radio interface is defined as Um in GSM networks and Uu in UMTS networks. Also shown in the figure is another access area 502 which can be the handover destination of the mobile station or user equipment 510. Within the access area 502, the mobile station (MS) or user equipment (UE) 510 can connect to the base station system (BSS-B) 522 in a GSM network or a radio network system (RNS-B) 522 in an UMTS network through a radio interface (RI). As described earlier, the radio interface is defined as Um in GSM networks and Uu in UMTS networks. The BSS-A 521 can connect to the MSC-A 531 in core network using the A-interface of the GSM standard. In case of UMTS networks, the RNS-A 521 can connect to the 3G_MSC (3G_MSC-A) 531 using the Iu interface defined in 3gpp standards. Similarly, the BSS-B 522 can connect to the MSC-B 532 in core network using the A-interface of the GSM standard. In case of UMTS networks, the RNS-B 522 can connect to the 3G_MSC (3G_MSC-B) 532 using the Iu interface defined in 3gpp standards. It may be noted that MSC-A 531 or 3G_MSC-A 531 is referred to as the anchor MSC since it is in control of a call from initiation and MSC-B 532 or 3G_MSC-B 532 is referred to as the target MSC since it controls the network area of target of the handover. The mobile services switching centres, MSC-A 531 and MSC-B 532 can be connected through the MAP-E interface of GSM standards, the interface so referred to since the messages between the MSCs (531 and 532) are exchanged using MAP protocol.

Figure 6:
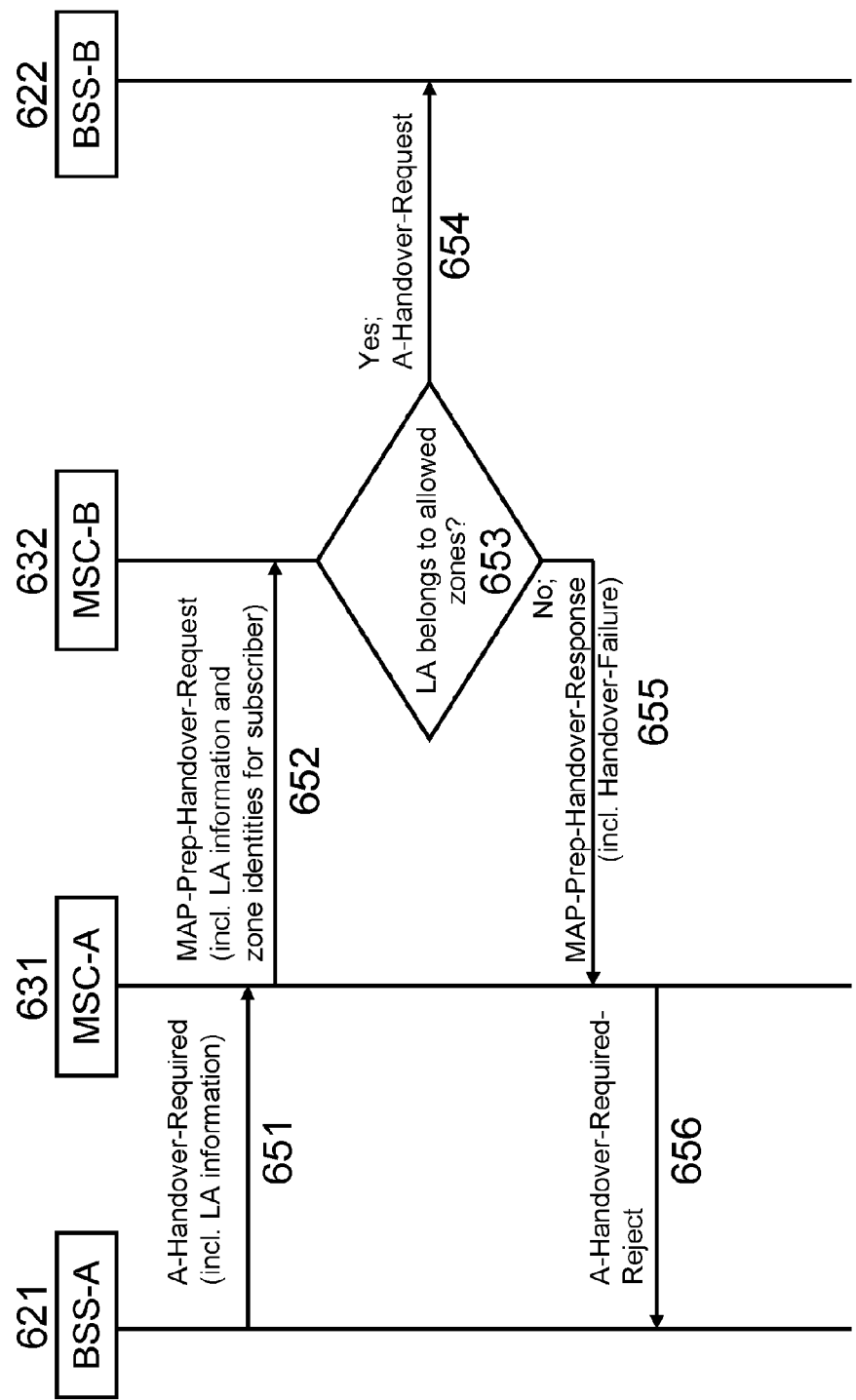
FIG. 6 shows an inter-MSC handover procedure in a GSM network according to an example of the present invention.

FIG. 6 illustrates an exemplary inter-MSC handover procedure in a GSM network in accordance with the present invention. A mobile station or user equipment of a subscriber can measure and periodically report to a base station system the signal quality of the current and neighboring cells (not shown in the figure). If the BSS-A 621 determines that, for instance, the signal quality is not good enough and a neighboring cell is offering a better signal quality, the BSS-A 621 can send a handover requirement message 651, e.g., A-Handover-Required, to MSC-A 631 over the A-interface. It may be noted that poor signal quality is only one exemplary reason for a handover requirement and there can be several other reasons for such a handover requirement, such as, for example, poor uplink/downlink quality or strength, traffic in a cell and need to reduce load in a serving cell. The handover required message 651 can contain the location area (LA) of the handover destination. When the MSC-A 631 determines that the handover destination belongs to the network area covered by another MSC (MSC-B 632), MSC-A 631, the anchor MSC, can send a MAP-Prep-Handover-Request message 652 to MSC-B 632, referred to as the target MSC. The MAP-Prep-Handover-Request message 652 can include LA information of the handover destination received from BSS-A 621 and a list of zone identities for the subscriber. It may be noted that during a call set up, the MSC-A 631 can receive at least one of a list of allowed zones and restricted zones, for example as zone identities, for the subscriber from the visiting location register (VLR), which could have originally received it from the home location register (HLR) at the time of location update. Upon receipt of the Prep-Handover-Request message 652, the MSC-B 632 can verify (653) if the LA belongs to an allowed zone. This is possible since a mapping of zone identities and location areas within MSC-B can be stored in the MSC-B. If MSC-B 632 determines that the LA belongs to an allowed zone for the subscriber, it can send an A-Handover-Request message 654 to the target base station system (BSS-B 622). Further, MSC-B 632 can send an MAP-Prep-Handover-Response including Handover-Acknowledgement. message (not shown in figure) to MSC-A 631. If MSC-B 632 determines that the LA does not belong to an allowed zone for the subscriber, it can send an MAP-Prep-Handover-Response including Handover-Failure message 655 to MSC-A 631. Subsequently, MSC-A 631 can send an A-Handover-Required-Reject message 656 to BSS-A 621.

It may be noted that even though MSC-A/3G_MSC-A 531, 631 does not directly interface with BSS-B/RNS-B 522, 622 after an inter-MSC handover, MSC-A 531, 631, the anchor MSC, can still remain involved in the call control. For example, ciphering, assignment and charging can still be performed in MSC-A 531, 631 and the active call may be handed over back to MSC-A 531, 631.

Figure 7:
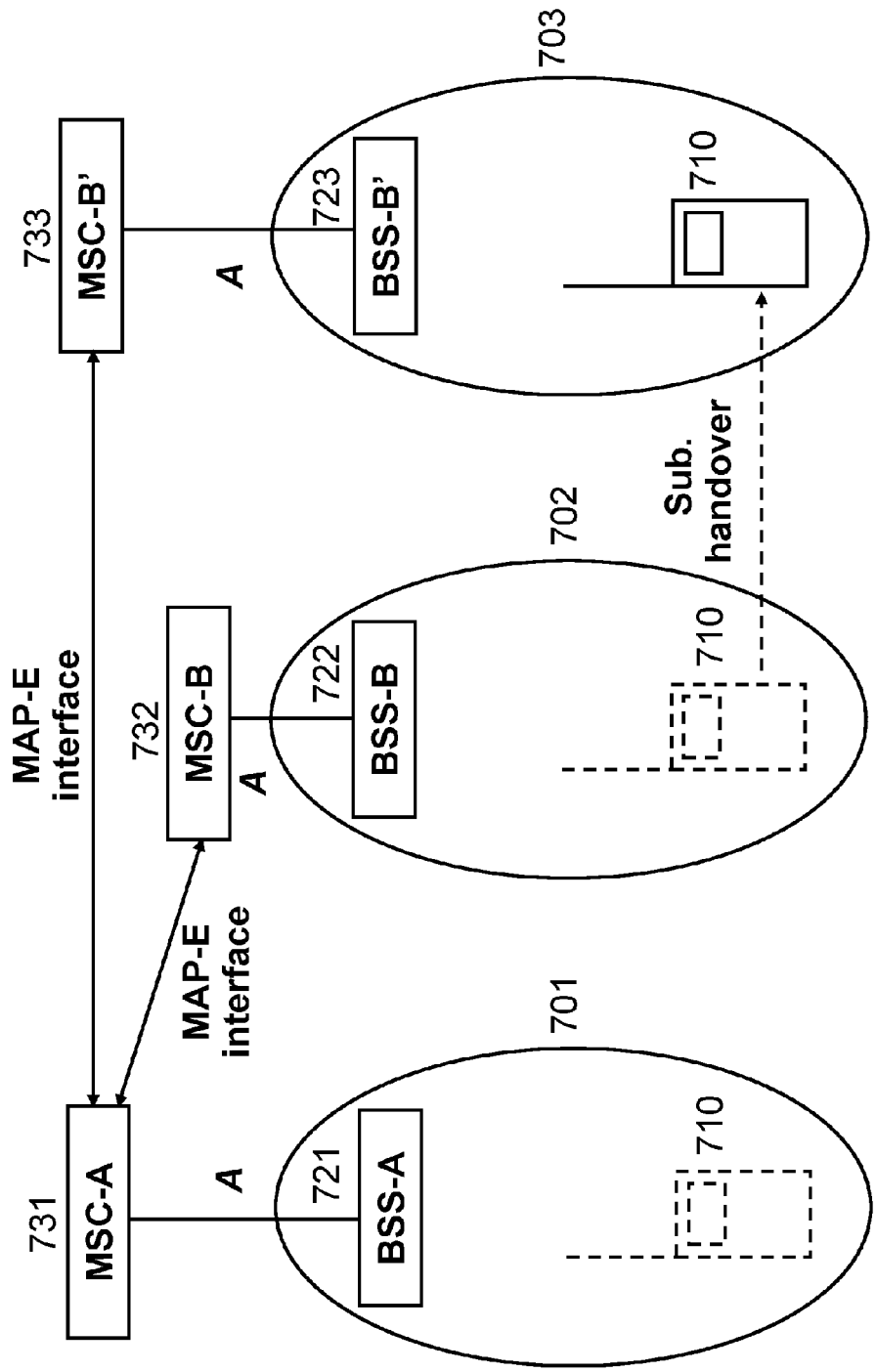
FIG. 7 shows a network architecture, according to the present invention, wherein a subsequent inter-MSC handover may be performed.

FIG. 7 illustrates a subsequent inter-MSC handover in GSM networks. Relevant interfaces between the network elements are also shown in figure V. Within the access area 701, the mobile station (MS) or user equipment (UE) 710 can connect to the base station system (BSS-A) 721 in a GSM network through the radio interface (RI). The radio interface is defined as Um in GSM networks. Similarly, in the access areas 702 and 703, which are target of initial and subsequent handovers respectively, the mobile station or user equipment 710 can connect to the base station system BSS-B 722 and BSS-B' 723 respectively through the radio interface. The base stations systems BSS-A 721, BSS-B 722 and BSS-B' 723 can connect to the MSC-A 731, MSC-B 732 and MSC-B' 733 respectively in core network using the A-interface of the GSM standard. The mobile services switching centres, MSC-B 732 and MSC-B' 733 may connect to MSC-A 731 through a MAP E-interface of GSM standards, the interface so referred to since the messages between the MSCs can be exchanged using MAP protocol.

Figure 8:
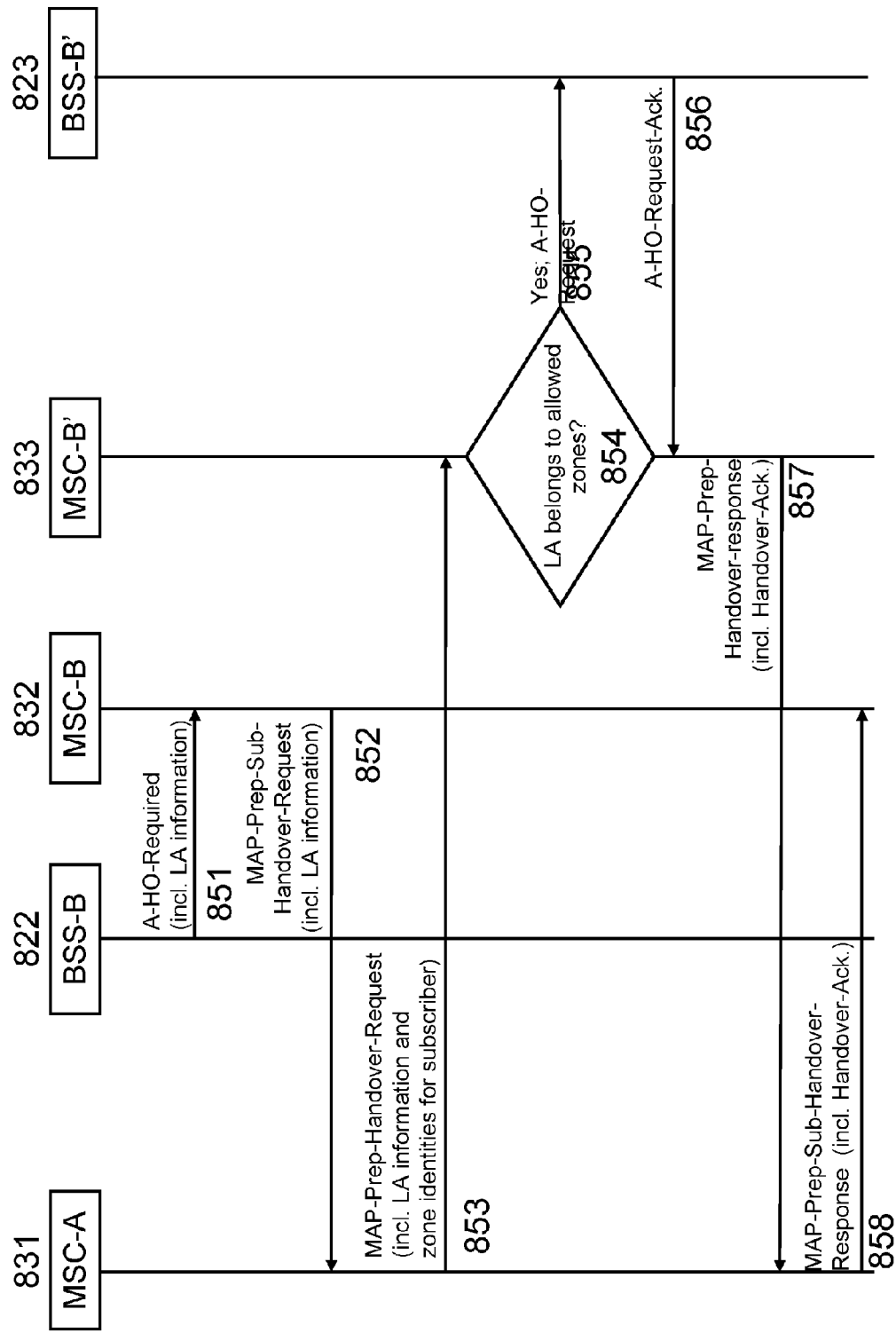
FIG. 8 shows a successful subsequent inter-MSC handover procedure in a GSM network according to an example of the present invention.
Figure 9:
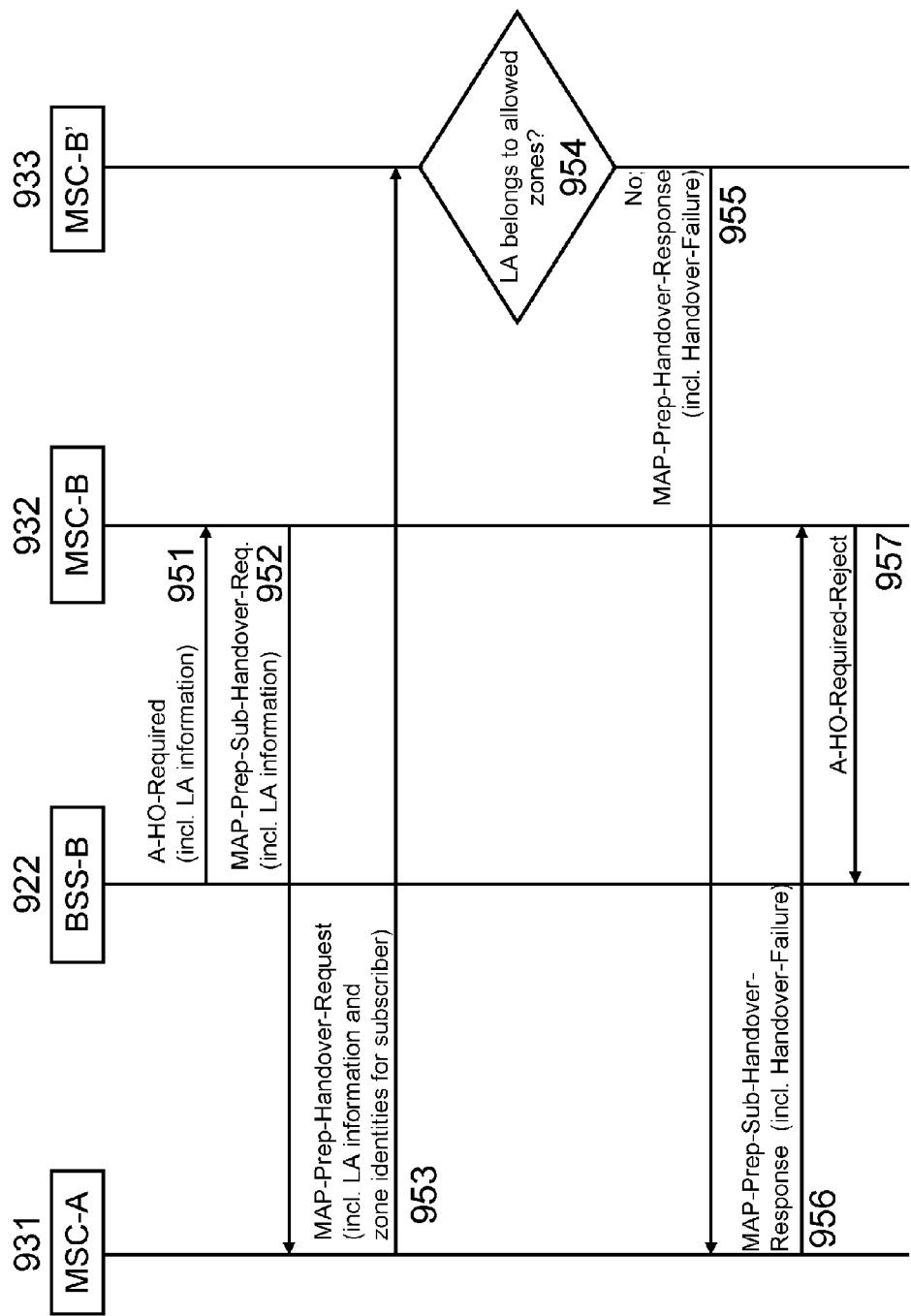
FIG. 9 shows a failed subsequent inter-MSC handover procedure in a GSM network according to an example of the present invention.

FIGS. 8 and 9 illustrate an exemplary subsequent inter-MSC handover procedure in a GSM network in accordance with the present invention. In this case, an initial handover may have been performed by MSC-A 831, 931 to MSC-B 832, 932. Subsequently, BSS-B 822, 922 can determine the necessity of a subsequent handover and can send a handover requirement message 851, 951, e.g., A-Handover-Required, to MSC-B 832, 932 over the A-interface. The handover required message 851, 951 contains the location area (LA) of the handover destination. Since the anchor MSC, MSC-A 831, 931 controls the call, MSC-B 832, 932 can send a prepare subsequent handover message 852, 952 that includes the LA information of handover destination to MSC-A 831, 931. When the MSC-A 831, 931 recognizes that the handover destination belongs to the network area covered by MSC-B' 833, 933, it can send a MAP-Prep-Handover-Request message 853, 953 to MSC-B' 833, 933. The MAP-Prep-Handover-Request message 853, 953 can include LA information of the handover destination and a list of zone identities for the subscriber. It may be noted that during a call set up, the MSC-A 831, 931 can receive at least one of a list of allowed zones and restricted zones, for example as zone identities, for the subscriber from the visiting location register (VLR), which could have originally received it from the home location register (HLR) at the time of location update. Upon receipt of the Prep-Handover-Request message 853, 953, the MSC-B' 833, 933 can verify (854,954) if the LA belongs to an allowed zone. This is possible since a mapping of zone identities and location areas within MSC-B' can be stored in the MSC-B'. Depending on the result of the verification, there are two possible situations as illustrated in FIGS. 8 and 9 respectively.

If MSC-B' 833 determines that the LA belongs to an allowed zone for the subscriber, it can send a Handover-Request message 855 over A-interface to BSS-B' 823 as shown in FIG. 8. In response to the handover request message 855, BSS-B' can send a Handover-Request-Acknowledgement message 856 over A-interface to MSC-B'. Further, MSC-B' can send a MAP-Prepare-Handover-Response including Handover-Acknowledgement message 857 to MSC-A. Subsequently, MSC-A 831 can send a MAP-Prep-Sub-Handover-Response message including Handover-Acknowledgement 858 to MSC-B 832, which in turn can send a handover command message (A-HANDOVER-COMMAND) message over A-interface to BSS-B 822 (not shown in FIG. 8).

If, on the other hand, MSC-B' 933 determines that the LA does not belong to an allowed zone for the subscriber, it can send an MAP-Prep-Handover-Response including Handover-Failure message 955 to MSC-A 931, as shown in FIG. 9. Subsequently, MSC-A 931 can send a MAP-Prep-Sub-Handover-Resp. including Handover-Failure message 956 to MSS-B 932, which in turn can send a handover required reject (A-Handover-Required-Reject) message 957 over the A-interface to BSS-B 922.

Figure 10:
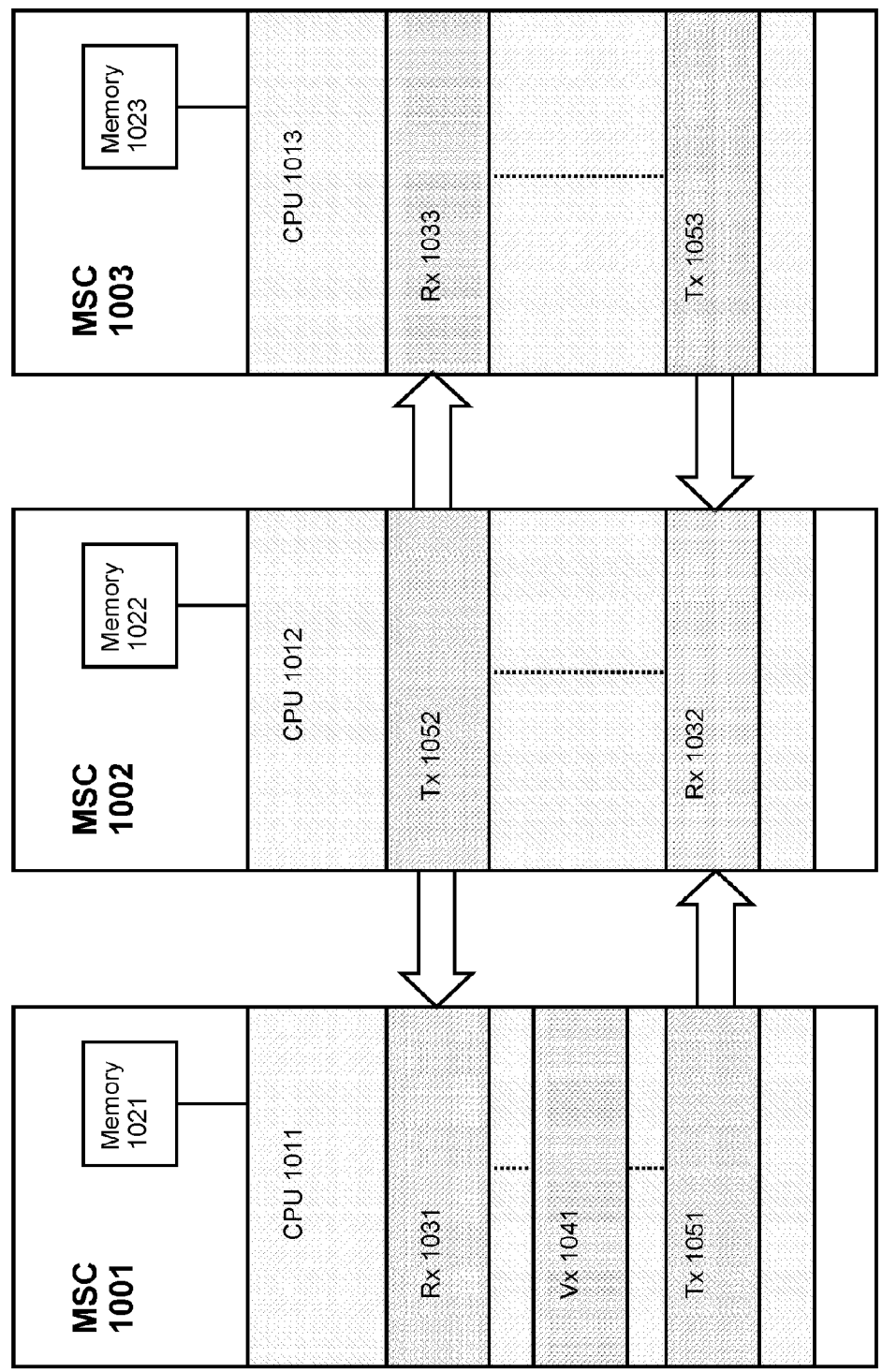
FIG. 10 shows apparatuses and systems according to an example of the present invention.

FIG. 10 illustrates apparatuses (e.g., MSCs 1001 and 1002) for service access control according to the present invention. For sake of simplicity, only the main functions of the apparatuses are illustrated in the figure.

The first apparatus in accordance with the present invention (e.g., MSC 1001) may comprise a CPU (or a core functionality) 1011, a memory 1021, a receiver (or a means for receiving) Rx 1031, a verifier (or a means for verifying) Vx 1041, and a transmitter (or means for transmitting) Tx 1051.

It may be noted that the receiver 1031, the verifier 1041 and the transmitter 1051 of the MSC 1001 may be functionalities running on the CPU 1011 of the MSC, or may alternatively be separate functional entities or means. Furthermore, the verifier 1041 of the MSC 1001 may be, e.g., i) a functionality residing in the receiver 1031 of the MSC, (ii) a functionality residing partly in the receiver 1031 and partly in the transmitter 1051 of the MSC, or ii) may be a separate functionality of the MSC. In case of the verifier 1041 being part of the receiver, the verifier interfaces with the transmitter 1030 to transmit results of a verifying step performed by it. In case of verifier 1041 being a separate functionality of the MSC, it interfaces with the receiver 1031 and transmitter 1051 to receive messages for verification and transmit results of verification respectively.

The CPU 1011 may be configured to process various data inputs and to control the functions of the memory 1021, the receiver 1031, the verifier 1041, and transmitter 1051. In FIG. 10, the dotted lines show optional configurations while solid lines show the core configuration according to the present invention. The memory 1021 may serve e.g. for storing code means for carrying out e.g. the methods according to the examples of the present invention, when run e.g. on the CPU 1011. For example, the memory may store a mapping of location areas and zone identities. Additionally, the memory may also store policies or rules related to a communication system.

It is to be noted that the receiver 1031 and the transmitter 1051 may alternatively be provided as integral transceivers. It is further to be noted that the transmitters/receivers may be implemented i) as physical transmitters/receivers for transceiving e.g. via the air interface, ii) as routing entities e.g. for transmitting/receiving data packets e.g. in a PS (packet switched) network, or, iii) as any suitable combination of i) and ii).

The receiver 1031, for example, may perform receiving any of the handover or relocation related messages. Examples of such messages are:
handover required message 251, 451 from a base station system 221, 421 (in GSM networks) over A-interface;
relocation required message 351 from a radio network system 321 (in UMTS networks) over Iu-interface;
Prep-Handover Request message 652, 853, 953 from an anchor MSC 631, 831, 931 over F-interface (MAP message).

The exemplary receiver 1031 of the present invention may perform receiving a MAP-Prep-Handover-Request message 652, 853, 953 over E-interface from an anchor MSC 631, 831, 931 (the MSC where a call was initiated), which message includes zone information for a subscriber. It may be noted that the receiver 1031 additionally performs receiving messages pertaining to call set up etc.

The transmitter 1051, for example, may perform transmitting any of the handover or relocation related messages. Examples of such messages are:
handover request message 253, 654 to a base station system 222, 622 (in GSM networks) over A-interface;
relocation request message 353, 453 to a radio network system 322, 422 (in UMTS networks) over Iu-interface;
handover required reject message 254, 454 to a base station system 221, 421 (in GSM networks) over A-interface;
relocation preparation failure message 354 to a radio network system 321 (in UMTS networks) over Iu-interface;
Handover response message 855 to an anchor MSC 831 over E-interface (MAP message);
Handover failure message 655, 955 to an anchor MSC 631, 931 over E-interface (MAP message).

It may be noted that the transmitter 1051 may additionally perform transmitting messages pertaining to call set up etc.

The verifier 1041, for example, in one embodiment as part of the receiver 1031, may perform upon receipt of a handover required message 251, 451, 351, 652, 853, 953 (e.g., A-Handover-Required, Iu-Relocation required, MAP-Prep-Handover-Request) verifying (252, 352, 452, 653, 854, 954) if the location area (LA) of the handover destination included in the message belongs to an allowed zone for the subscriber. The verifier further may interface with the transmitter 1051 to transmit the results of the verification.

In another embodiment, wherein the verifier 1041 may partly be a functionality within the receiver 1031 and partly be a functionality within the transmitter 1051, the functionality residing in the receiver may verify (252, 352, 452, 653, 854, 954) if the location area (LA) of the handover destination belongs to an allowed zone for the subscriber, and the functionality residing in the transmitter may transmit the result of the verification.

In yet another embodiment, the verifier 1041 may a separate functionality within the MSC. In this case, the verifier may interface with the receiver 1031 to verify (252, 352, 452, 653, 854, 954) if the location area (LA) of the handover destination belongs to an allowed zone for the subscriber, and further may interface with the transmitter 1051 to transmit the result of the verification.

In another aspect of the present invention, a second apparatus (e.g., MSC 1002) comprising a transmitter 1052 and receiver 1032 is disclosed, as illustrated in FIG. 10. The apparatus 1002 may have functions similar to apparatus 1001, with the exception of an absence of a verifier. The exemplary transmitter 1052 in apparatus 1002 may perform transmitting a Prep-Handover-Request message 652, 853, 953 that may include LA information and zone information for a subscriber.

The present invention also relates to a system which, in one embodiment, may comprise the above-described first apparatus (e.g., MSC 1001 in FIG. 10) and a plurality of base stations systems (e.g., 121, 122, 221, 222, 421 in FIGS. 1-4) or radio network systems (321, 322, 422 in FIGS. 3-4).

In another embodiment, the present invention relates to a system which may comprise the above-described first apparatus (e.g., MSC 1001 in FIG. 10) and the above-described second apparatus (e.g., MSC 1002 in FIG. 10).

In yet another embodiment of the present invention, a system is disclosed that comprises the above-described first apparatus (e.g., MSC 1001 in FIG. 10), the above-described second apparatus (e.g., MSC 1002 in FIG. 10) and a further apparatus (e.g., MSC 1003 in FIG. 10). The further MSC 1003 may comprise a transmitter that may perform transmitting a Prep-Sub-handover-request message that includes LA information over E-interface to the second apparatus (MSC 1002 in FIG. 10).

The present invention further relates to a computer program product. The computer program product may comprise code means for performing methods for handover procedures described herein, when run on a processing means or module.

Although the present invention has been described herein before with reference to particular embodiments thereof, the present invention is not limited thereto and various modifications can be made thereto. For example, the examples presented here relate to circuit switched domain. However, the procedures of the invention described herein can be extended to packet switched domain wherein a service GPRS support node (SGSN) performs the functions of MSC. Further the invention can be extended to any inter-system handover scenarios, as for example, in a handover from GSM or UMTS to unlicensed mobile access (UMA) network. Examples of such procedures have not presented for sake of brevity.

The invention claimed is:

1. A method comprising:
    storing a mapping of zone identities and location areas;
    receiving from a first mobile services switching center a handover requisition message for a subscriber at a second mobile services switching center, the message comprising information relating to a location area of a handover destination and comprising at least one of a list of zone identities indicating zones wherein the subscriber is allowed to access services and a list of zone identities indicating zones wherein the subscriber is not allowed to access services, wherein the handover requisition message is a request for handover of a service being provided by the second mobile services switching center to the first mobile services switching center so that the service can be provided by the first mobile services switching center;
    verifying by the second mobile services switching center if the location area of the handover destination belongs to a zone wherein the subscriber is allowed to access services; and
    sending a first resultant message and a second resultant message based on a result of the verifying by the second core network entity,
    wherein if the result of the verifying is positive, sending the first resultant message, and
    wherein if the result of the verifying is negative, sending the second resultant message.

2. A method of claim 1, wherein the obtaining the information comprises obtaining the information during a location update.

3. The method according to claim 1, wherein the handover requisition message comprises one of the following:
    A-HANDOVER-REQUIRED message;
    Iu-RELOCATION-REQUIRED message; and
    MAP-Prep-handover-request message.

4. The method according to claim 1, wherein the first resultant message comprises one of the following:
    A-Handover-Request message; and
    Iu-Relocation-Request message.

5. The method according to claim 1, wherein the second resultant message comprises one of the following:
    A-Handover-Required-Reject message;
    Iu-Relocation-preparation-failure message; and
    MAP-Prep-Handover-Response comprising Handover-Failure message.

6. A receiving mobile services switching center apparatus comprising:
    a processor;
    a receiver configured to receive a handover requisition message from a mobile services switching center, the mobile services switching center being an entity different from the receiving mobile services switching center apparatus, comprising information relating to a location area of handover destination for a subscriber and at least one of a list of zone identities indicating zones wherein the subscriber is allowed to access services and a list of zone identities indicating zones wherein the subscriber is not allowed to access services, wherein the handover requisition message is a request for handover of a service being provided by the mobile services switching center to the receiving mobile services switching center apparatus so that the service can be provided by the receiving mobile services switching center apparatus;
    a storage configured to store a mapping of zone identities and location areas;
    a verifier configured to verify if the subscriber is allowed access services in the location area of handover destination; and
    a transmitter configured to send a first resultant message and a second resultant message based on a result of the verifying in said verifier,
    wherein if the result of the verifying is positive, the transmitter is configured to send the first resultant message, and
    wherein if the result of the verifying is negative, the transmitter is configured to send the second resultant message.

7. The apparatus according to claim 6, wherein the handover requisition message comprises one of the following:
    A-HANDOVER-REQUIRED message;
    Iu-RELOCATION-REQUIRED message; and
    MAP-Prep-handover-request message.

8. The apparatus according to claim 6, wherein the resultant message comprises one of the following:
    A-Handover-Request message;
    Iu-Relocation-Request message;
    MAP-Handover-Response message;
    A-Handover-Required-Reject message;
    Iu-Relocation-preparation-failure message; and
    MAP-Prep-Handover-Response comprising Handover-Failure message.

9. A system comprising:
    a processor;
    a first mobile services switching center apparatus comprising a first receiver configured to receive a handover requisition message from a second mobile services switching center apparatus comprising information relating a location area of a handover destination for a subscriber and at least one of a list of zone identities indicating zones wherein the subscriber is allowed to access services and a list of zone identities indicating zones wherein the subscriber is not allowed to access services, a storage configured to store a mapping of zone entities and location areas, a verifier configured to verify if the subscriber is allowed access services in the location area of handover destination, and a first transmitter configured to send a first resultant message and a second resultant message based on a result of the verifying in the verifier;

said system further comprising:

a second mobile services switching center apparatus comprising a second transmitter configured to send the handover requisition message comprising an indication of zones wherein the subscriber is allowed to access services, wherein the handover requisition message is a request for handover of a service being provided by the second mobile services switching center apparatus to the first mobile services switching center apparatus so that the service can be provided by the first mobile services switching center apparatus, wherein if the result of the verifying is positive, the transmitter is configured to send the first resultant message, and wherein if the result of the verifying is negative, the transmitter is configured to send the second resultant message.

10. A computer program embodied on a non-transitory computer readable medium, the computer program, when executed by a processor, causes the processor to store a mapping of zone identities and location areas;

receive from a first mobile services switching center a handover requisition message for a subscriber at a second mobile services switching center, the message comprising information relating to a location area of a handover destination and comprising at least one of a list of zone identities indicating zones wherein the subscriber is allowed to access services and a list of zone identities indicating zones wherein the subscriber is not allowed to access services, wherein the handover requisition message is a request for handover of a service being provided by the second mobile services switching center to the first mobile services switching center so that the service can be provided by the first mobile services switching center;

verify by the second mobile services switching center if the location area of the handover destination belongs to a zone wherein the subscriber is allowed to access services; and send a first resultant message and a second resultant message based on a result of the verifying by the second core network entity, wherein if the result of the verifying is positive, the computer program, when executed by the processor, causes the processor to send the first resultant message, and wherein if the result of the verifying is negative, the computer program, when executed by the processor, causes the processor to send the second resultant message.

* * * * *